(12) United States Patent
Gonthier et al.

(10) Patent No.: US 9,199,843 B2
(45) Date of Patent: Dec. 1, 2015

(54) SELF-REGULATED PRODUCTION, UNDER SUBMERGED CONDITIONS, OF A GAS GENERATED BY CHEMICAL REACTION BETWEEN A LIQUID AND SOLID; ASSOCIATED DEVICE

(75) Inventors: Gilles Gonthier, Pessac (FR); Pierre Yvart, Vert le Petit (FR); Christian Perut, Saint Fargeau Ponthierry (FR)

(73) Assignee: HERAKLES, Le Hallian (FR)

( * ) Notice: Subject to any disclaimer, the term of this patent is extended or adjusted under 35 U.S.C. 154(b) by 0 days.

(21) Appl. No.: 13/976,862

(22) PCT Filed: Dec. 28, 2011

(86) PCT No.: PCT/FR2011/053201
§ 371 (c)(1),
(2), (4) Date: Jan. 28, 2014

(87) PCT Pub. No.: WO2012/089984
PCT Pub. Date: Jul. 5, 2012

(65) Prior Publication Data
US 2014/0147375 A1    May 29, 2014

(30) Foreign Application Priority Data
Dec. 30, 2010    (FR) .................................... 10 61374

(51) Int. Cl.
| | | |
|---|---|---|
| C01B 3/08 | (2006.01) | |
| C01B 3/06 | (2006.01) | |
| B01J 7/02 | (2006.01) | |
| C01B 3/10 | (2006.01) | |

(52) U.S. Cl.
CPC ... *C01B 3/06* (2013.01); *B01J 7/02* (2013.01); *C01B 3/065* (2013.01); *C01B 3/10* (2013.01); *B01J 2219/00182* (2013.01); *Y02E 60/362* (2013.01)

(58) Field of Classification Search
CPC ........................................................ C01B 3/065
See application file for complete search history.

(56) References Cited

U.S. PATENT DOCUMENTS

| | | | |
|---|---|---|---|
| 2,211,430 A | | 8/1940 | Ness |
| 2,531,657 A | * | 11/1950 | Tobler, Jr. ..................... 422/239 |
| 3,229,291 A | * | 1/1966 | Dell Aria et al. ................ 342/8 |
| 4,155,712 A | | 5/1979 | Taschek |
| 4,357,309 A | | 11/1982 | Arnold et al. |
| 8,497,043 B2 | * | 7/2013 | Cleland ........................ 429/421 |
| 2009/0305095 A1 | * | 12/2009 | Sarata et al. ................... 429/19 |

FOREIGN PATENT DOCUMENTS

| | | |
|---|---|---|
| DE | 2436002 | 2/1976 |
| FR | 554247 | 6/1923 |
| FR | 2297077 | 8/1976 |
| GB | 1172691 | 12/1969 |
| GB | 1505842 | 3/1978 |
| WO | WO 2009/120266 | * 10/2009 |

* cited by examiner

*Primary Examiner* — Melvin C Mayes
*Assistant Examiner* — Kenneth Vaden
(74) *Attorney, Agent, or Firm* — Hamre, Schumann, Mueller & Larson P.C.

(57) ABSTRACT

The present invention relates to a process for the self-regulated production as a function of the demand, under submerged conditions, of a gas (G), said gas (G) being generated by a chemical reaction between a liquid (L) and a solid (S) (hydrogen generated by hydrolysis of a metal hydride, for example) and not being polluted between the generation thereof and the delivery thereof. The present invention also relates to a device suitable for the implementation of said process.

11 Claims, 2 Drawing Sheets

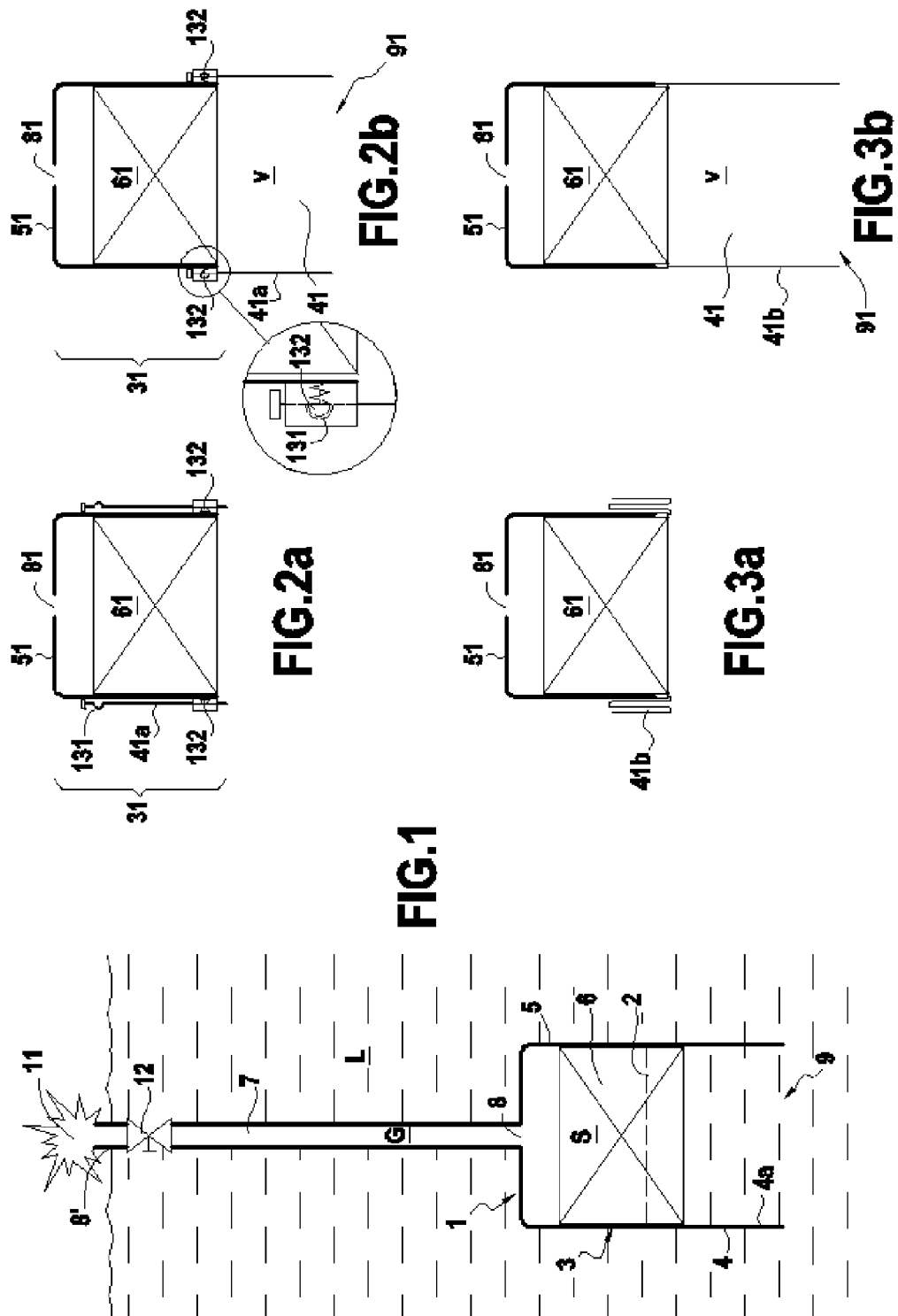

Figure 4:
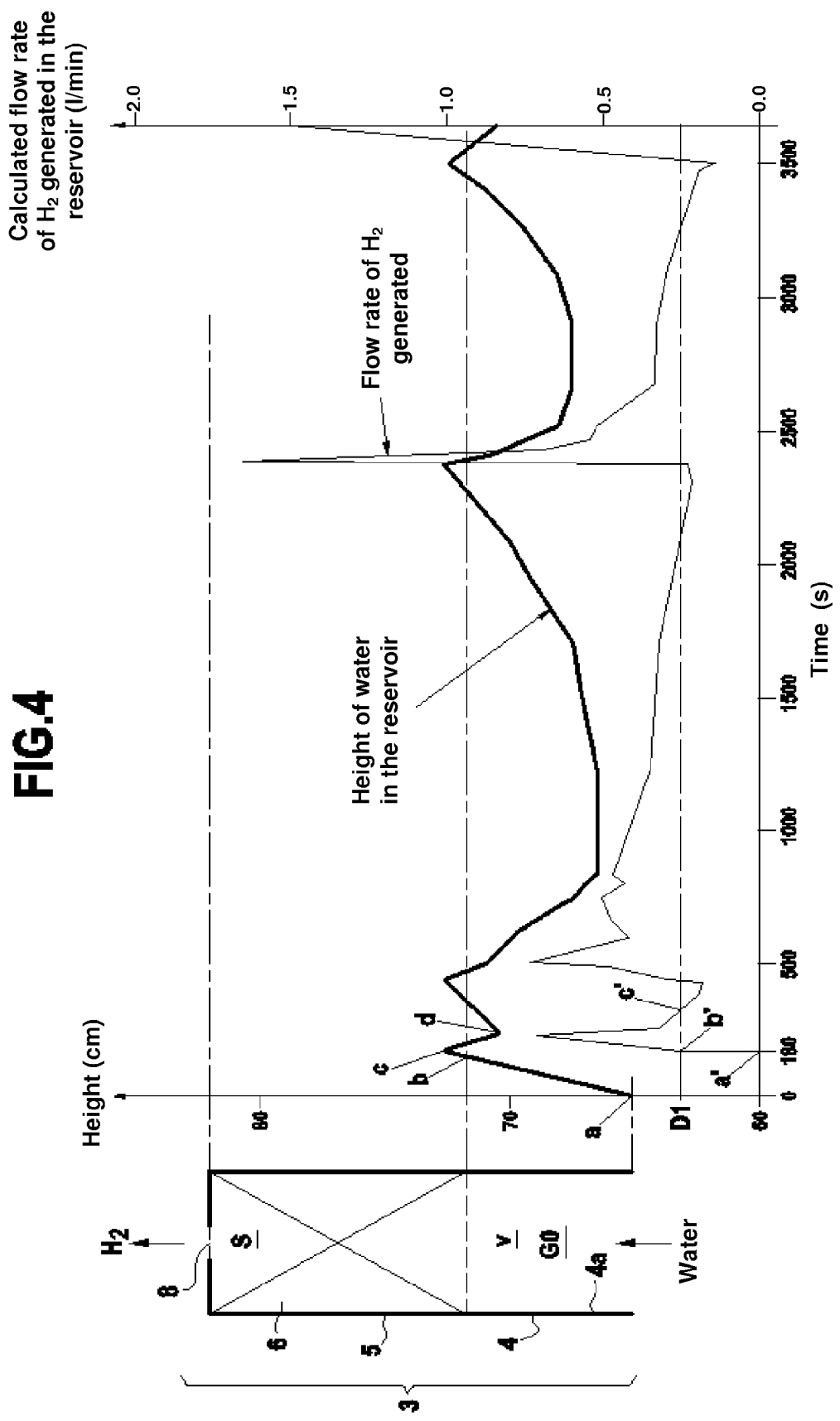

SELF-REGULATED PRODUCTION, UNDER SUBMERGED CONDITIONS, OF A GAS GENERATED BY CHEMICAL REACTION BETWEEN A LIQUID AND SOLID; ASSOCIATED DEVICE

The present invention relates to a process for the self-regulated production of a gas, as a function of demand, under submerged conditions, said gas being generated by a chemical reaction between a liquid and solid (hydrogen generated by hydrolysis of a metal hydride, for example) and not being polluted between the generation thereof and the delivery thereof. The present invention also relates to a device suitable for the implementation of said process.

One field more particularly affected by the present invention is that of supplying hydrogen to floating burners, burners having for example a signaling function or thermal target function. Another affected field is that of supplying hydrogen to a floating or submerged fuel cell. Supplying hydrogen to burners or fuel cells requires high-purity hydrogen. It is thus aimed to optimize the reaction yields (reactions carried out with said hydrogen) and to limit the pollution capable of deteriorating the burner or the cell. Generally, any application, in particular in a maritime environment, requiring a regulated supply of high-purity gas (gas produced by a reaction between a liquid and a solid) is affected by the present invention.

Controlling the hydrolysis reaction of a solid in order to generate a regulated flow rate (that is regulated on demand) of gas with delivery of said generated gas without introducing pollution within it is a technical problem that those skilled in the art have to date tackled by means of more or less complex devices with more or less satisfactory results.

U.S. Pat. No. 4,155,712 describes a miniature hydrogen generator for supplying a fuel cell comprising a water reservoir supplying a first water chamber below, itself in communication via a membrane with a second chamber containing a metal hydride. This second chamber is connected to the hydrogen-consuming device. This gas-permeable membrane allows water vapor to pass from the first chamber to the second chamber in order to react with the metal hydride and thus produce hydrogen by hydrolysis. Balancing the pressures between the two chambers controls the height of water in the first chamber, and therefore the amount of water vapor passing from the first chamber to the second chamber, which makes it possible to regulate the flow rate of hydrogen produced by hydrolysis (of the metal hydride by the water vapor) as a function of demand. The process for regulating the production of hydrogen is therefore based on the balancing of the pressures between two chambers via a membrane and requires a complex adjustment that is difficult to control. It is not suitable for operation when submerged, nor for the production of hydrogen under pressure.

Devices for inflating floating balloons by means of submerged solid hydrogen generators moreover exist. Patent GB 1 172 691 and patent application FR 2 297 077 describe such devices. These devices have complex structures with a spring or valve. Within them, the solid/liquid reaction, carried out with a controlled amount of liquid, is performed with a close solid/liquid contact—said solid being immersed in said liquid (and being able to be likened to an effervescent tablet)—so that the gas generated is also in close contact with said liquid. Moreover, these devices operate without self-regulation of the gas production. This problem of self-regulation of the gas production is not tackled in these documents, insofar as the gas (hydrogen) generator must just produce the volume of gas needed for the inflation of the balloon. U.S. Pat. No. 2,531,657 itself describes a submerged balloon inflation device that operates with self-regulation of the production of inflation gas. This device comprises a container, the bottom portion of which is perforated and placed on which is a solid charge capable of generating gas by hydrolysis. This container is arranged inside a bell provided with a retractable base and with a gas exhaust line in its upper portion. When the device according to said US patent is submerged in a liquid, (after retracting the base of said bell) said liquid penetrates into said bell and comes into contact with the solid charge via the perforations of the bottom portion of the container. The gas produced by the reaction between the solid charge and the liquid escapes via said perforations and rises to the top of the bell by passing through the liquid contained in the bell. The turbulences thus created by the passage of the gas in the liquid are favorable to bringing fresh liquid into contact with the solid charge. The gas delivered by this device is capable, due to its passage through the liquid, of carrying along droplets and/or vapor of the liquid and also solid impurities (especially when the liquid is seawater), which in itself is not problematic for inflating a balloon but does not meet the purity requirements of gas delivered for supplying a burner or a hydrogen cell.

Patents FR 554 247 and U.S. Pat. No. 2,211,430 relate to acetylene generators comprising a solid block, placed in a first reservoir, that reacts on contact with a liquid, contained in a second reservoir, said liquid penetrating via gravity into said first reservoir. When the demand for gas decreases or is cancelled (by action on the gas discharge valve), the pressure of the gas generated in the first reservoir increases and pushes back the liquid into the second reservoir, thus stopping the reaction. These generators are not submerged. Their architecture is similar to the architecture of the device according to U.S. Pat. No. 2,531,657, the gases produced escaping via the bottom by passing through the liquid.

The prior art does not therefore describe a process or device for the self-regulated production, as a function of demand, under submerged conditions, of gas generated by hydrolysis of a solid, with delivery of said generated gas without introducing pollution within it (said delivery not involving "excessive gas/liquid contact").

With reference to this technical problem, the Applicant proposes an innovative and efficient solution. Said solution is analyzed in terms of process and of device and is remarkable in its simplicity.

According to a first subject, the present invention relates to a process for the production, self-regulated as a function of demand, of a gas (G), said process being carried out under submerged conditions and comprising:

the submersion in a liquid (L), capable of reacting with a solid (S) in order to produce said gas (G), of a reservoir containing a charge of said solid (S); said charge being arranged in the upper portion of the internal volume of said reservoir above a buffer volume free of any charge; said reservoir having in its bottom portion at least one opening suitable for the penetration of said liquid (L) into said free buffer volume and in its top portion at least one orifice suitable for discharging gas (G0, G);

the penetration of said liquid (L) into said free buffer volume (into the internal volume of said reservoir) via said at least one opening and the rise in level of said liquid (L) in said internal volume of said reservoir with discharging of the gas initially present (G0) in said reservoir through said at least one orifice;

the generation of gas (G) by reaction of said solid (S) in contact with said liquid (L) (by reaction of said solid (S) with said liquid (L) when said liquid (L) is in contact with said charge of solid (S)), the rise of said gas (G) in said internal volume of said reservoir toward said at least one orifice and the discharging of said gas (G) via said at least one orifice; the level of said liquid (L) in said reservoir changing by itself as a function of the difference between the volume flow rate of gas generated and the volume flow rate of gas discharged via said at least one orifice.

The volume flow rate of gas generated is a function of the fraction of the solid charge in contact (reacting) with the liquid. The volume flow rate of gas discharged is a function of the hydrostatic pressure in the reservoir and of the cross section of the at least one discharge orifice (and also of the physical characteristics of the gas generated). The cross section of said at least one discharge orifice may be constant or variable (it may for example be controlled by a flow controller or a pressure regulator). Thus, the demand in terms of volume flow rate of gas may simply correspond to the discharge flow rate of the generated gas through the at least one discharge orifice of constant cross section or may correspond to a volume flow rate of discharged gas set by a flow controller or by a pressure regulator (controlling the cross section of the at least one orifice).

It is of course understood that, due to its structure and/or its positioning (its arrangement) in the reservoir, the charge enables the circulation of the liquid (L) and of the gases (G0, G) in the reservoir; said gases (G0, G) circulating from the bottom to the top within said reservoir.

It already emerges from the remarks above that the process of the invention has the certain advantage of limiting the contact between the generated gas and the liquid, by making said gas rise ("directly") in the reservoir in the direction of the at least one discharge orifice. Said generated gas, for its delivery, does not pass through the liquid-filled buffer volume, and thus avoids becoming excessively loaded with said liquid, in the form of vapor and/or droplets, and with impurities (contained in said liquid). The process of the invention therefore makes it possible to deliver, with self-regulation, a high-purity gas (suitable in particular for supplying burners and fuel cells (see above)).

The process of the invention therefore comprises two preliminary phases and one actual gas production phase (continuous or batch production).

The first preliminary phase consists of the positioning of a reservoir (containing the solid) in the liquid (submersion phase). Said reservoir therefore contains a charge of the solid in question, means (at least one opening) for, following its submersion in the liquid, bringing said charge into contact with said liquid and means (at least one orifice) for enabling the discharge of the gas which will be generated following the solid/liquid contact. Said contact is not immediate upon the submersion. For this purpose, a free buffer volume is indeed provided in the bottom portion of said reservoir. Thus, the onset of the solid/liquid reaction and the emission of gas which results therefrom are controlled. This is also a certain advantage of the process of the invention.

The second preliminary phase consists, following the submersion of the reservoir, of the draining of the free buffer volume of said reservoir. The gas initially present (G0) in this volume is driven out by the liquid (L).

At the end of these two preliminary phases, following the solid/liquid contact, gas (G) is produced.

The process of the invention is suitable for the self-regulation of the production of gas (G) as a function of demand due to the fact that the level of liquid (L) (and therefore the fraction of solid charge wetted by said liquid (L)) in the reservoir is controlled by the volume of gas (G) present in said reservoir. The variation in the volume of gas present in the reservoir corresponds to the differential between the volume flow rate of gas produced and the maximum volume flow rate of gas that can be discharged (through the at least one orifice).

Thus:
if the volume flow rate of gas produced is greater than the maximum volume flow rate of gas discharged through said at least one orifice, the increase in the gas volume in the reservoir leads to the drop in the level of liquid in said reservoir, which leads to a reduction in the fraction of the solid charge in contact with said liquid (or even a separation between said liquid and said charge of solid: see below) resulting in a reduction (or even a stoppage) of the production flow rate of the gas;

if, when the level of liquid does not completely fill the reservoir, the volume flow rate of gas produced is less than the maximum volume flow rate of gas discharged through said at least one orifice, the reduction in the gas volume in said reservoir leads to a rise in the level of the liquid in said reservoir, which leads to an increase in the fraction of the solid charge in contact with said liquid resulting in an increase in the volume flow rate of the gas.

When the volume flow rate of gas discharged is low enough with respect to the volume flow rate of gas generated to lead to a drop in the level of the liquid below the charge in the buffer volume (volume free of any charge of the reservoir), the portion of the buffer volume free of liquid then acts as a storage zone for the excess gas generated with respect to the gas discharged. Such storage is temporary. It only lasts for the time that the process takes to self-regulate, in order to result in a balancing of the flow rates of (generated/discharged) gases and in a rise of said liquid in said reservoir.

The process of the invention furthermore has the great advantage of not exhibiting a risk of explosion via overpressure in the reservoir (this is particularly advantageous for explosive gases such as hydrogen). Any overpressure, induced by an excessive flow rate of generated gas with respect to the flow rate of discharged gas (overpressure that may, for example, be linked to an accidental obstruction of the orifice(s) for discharging the gases) is impossible. This is because, when the gas pressure in the reservoir becomes greater than the hydrostatic pressure, the level of liquid in said reservoir drops, optionally to the level of the at least one opening (opening of the buffer volume=opening of the reservoir) if this gas pressure becomes excessive; the excess gases then escaping as losses through said at least one opening. The gas pressure in the reservoir cannot therefore, in any case, exceed the hydrostatic pressure in the reservoir.

The liquid reacts with the solid (charge) in the volume thereof or principally at the surface thereof. The gases initially present G0 and the gas generated G are discharged through the at least one orifice after having reached it. Thus, the solid charge is advantageously permeable to liquids and gases or consists, for example, of a monolithic column with no through channel (see further on).

A person skilled in the art understands that the process of the invention assumes that the pressure of the liquid at the at least one orifice (for discharging the gas from the reservoir) is lower (at least very slightly lower, but lower) than the pressure of the liquid at the at least one opening (for entry of the liquid into the reservoir). This specifies the positioning of the reservoir in the liquid, this specifies the concepts of top portion and bottom portion of said reservoir. It is entirely possible, schematically, to liken the reservoir to an upsidedown funnel or to a bottomless bottle that include, on their narrowed end part, the solid charge.

The process of the invention may be carried out with any liquid/solid pair, said liquid and solid being capable of producing a gas by reaction with one another. Mention may be made, in no way limitingly, of the pairs below, while mentioning the nature of the gas produced:

(sodium (or calcium, magnesium or potassium) bicarbonate (or carbonate); acid water)→$CO_2$;
(AlN; $H_2O$)→$NH_3$;
(Zn; HCl (aq))→$H_2$.

The nature of the gas produced depends of course on the composition of the solid and on the nature of the liquid. The gas produced may be predominantly composed of one or more molecules ($H_2$ and/or $CO_2$ and/or $NH_3$, etc.).

It is possible, within the context of the implementation of the process of the invention, to control the gas pressure in the reservoir by varying the submersion depth of the reservoir in the liquid. This is because the gas pressure in the reservoir is almost equal (apart from the pressure drops) to that of the hydrostatic pressure of the liquid at the submersion depth of the reservoir. This possibility of control constitutes a certain advantage of the process of the invention.

The process of the invention therefore enables a self-regulation of the volume flow rate of gas produced as a function of demand (i.e. as a function of the volume flow rate of gas discharged), without using mechanical means for this self-regulation. The process of the invention is in this respect a process that is extremely simple to implement. It also makes it possible, as indicated above, to set the pressure of the gas delivered by choosing the submersion depth. It finally makes it possible, as also indicated above, to deliver the generated gas unpolluted.

The gas discharged from the reservoir via the at least one orifice may be delivered at depth or at the surface of the submersion liquid.

According to one implementation variant (see above), the process of the invention also comprises a control of the volume flow rate of the gas discharged by controlled variation of the cross section of the at least one orifice (for discharging said gas). Such a control makes it possible to vary, over time, the volume flow rate of the gas produced that is discharged, according to the requirement of the user.

The solid charge (which is permeable (due to its nature or due to the presence of at least one channel in its volume) to liquids and to gases for a good progression of the solid/liquid reaction, and a good discharge of the gas generated from the solid mass, or which may also be arranged in the form of a column that does not occupy the entire width of the upper portion of the internal volume of the reservoir) is in fact a charge from the prior art, which may be characterized by its composition and its geometry. As regards its geometry, it may in particular consist of one or more monolithic blocks optionally having at least one through channel (enabling the passage of the gases (G0 and G) and of the liquid (L) vertically from the bottom portion to the top portion of said reservoir, in particular assuming that said block(s) obstruct(s) the reservoir), of pellets (arranged in bulk or ordered), of a powder or of a foam. As regards its composition, it may comprise (or even consist of) a metal hydride, advantageously a metal (alkali or alkaline-earth metal) borohydride, very advantageously $Mg(BH_4)_2$ or $NaBH_4$ ($NaBH_4$ being particularly preferred). Such a hydride is particularly suitable for reacting with water (freshwater, seawater, aqueous hydrogen peroxide solution) and generating hydrogen (via hydrolysis). The solid may also contain in its composition, generally in a proportion of less than 5% by weight, additives such as a reaction catalyst (such as citric acid for example), a binder, an antioxidant, and agents that facilitate the shaping (in the case where the charge is in the form of pellets or a block).

Generally, the process of the invention is advantageously carried out with freshwater, seawater or aqueous hydrogen peroxide solution as the liquid.

Within the context of an advantageous implementation variant of said process, solid and liquid are suitable for generating hydrogen. The hydrogen thus generated may in particular be used for supplying a component chosen from fuel cells, burners and combustion turbines. The process of the invention is very advantageously implemented for such a supply. In view of the remarks above, it is understood that the process of the invention is very particularly suitable for the regulated supply of hydrogen that is (virtually) free of impurities to fuel cells, hydrogen burners and combustion turbines in a maritime context. It is not however entirely ruled out for said process to be implemented in order to inflate structures with hydrogen (or even with another gas), although the self-regulating function of the production of hydrogen (or of said any other gas) is not usually necessary in such a context.

According to a second subject, the invention relates to a device intended to be submerged, for the self-regulated generation of gas, said device being suitable for the implementation of the process described above. Said device comprises a reservoir having:
- a top chamber containing, stably, in its internal volume, a solid charge and being provided with at least one orifice suitable for discharging gas;
- a bottom chamber, said bottom chamber being delimited by a fixed or mobile wall and provided with at least one opening intended for the penetration of liquid into its internal volume;

said top and bottom chambers communicating with one another, by advantageously being contiguous.

The device comprises a single part: the reservoir (comprising the two chambers) and it is entirely possible, schematically, to liken said reservoir to an upsidedown funnel or to a bottomless bottle that include, on their narrowed end part, the solid charge.

The solid charge is stabilized (arranged in a stable manner) in the upper chamber of the reservoir by any means suitable for its texture. In the case where said solid charge is a pulverulent charge or consists of pellets, it is for example placed in a wire-mesh envelope. In the case where said solid charge is a block (optionally having through channel(s)) or a foam, it is for example held by tabs fastened to the walls of the reservoir. Said solid charge may, according to one variant, obstruct the top chamber of the reservoir (it is then possible to speak of a horizontal charge; it is understood, within the context of this variant, that the at least one gas discharge orifice is above said horizontal charge and that said horizontal charge (powder, foam or monolith(s) with through channel(s)) is permeable to liquids and gases) or, according to another variant, be in the form of a column (monolith(s) without through channel(s)), firmly attached to the upper wall of the top chamber (it is then possible to speak of a vertical charge).

In any case, due to its structure and/or its positioning (its arrangement), the charge enables the circulation of the liquid (L) and of the gases (G0, G) in the reservoir, said gases (G0, G) circulating from the bottom to the top within said reservoir.

Said at least one gas discharge orifice may have a controlled variable cross section, which makes it possible to control the volume flow rate of gas discharged from the reservoir, over time, as necessary.

It should be noted that the two top and bottom chambers are not necessarily structurally separated. It is understood that the top chamber comprises in any case the top portion of the reservoir which contains the solid charge and the bottom chamber the bottom portion of the reservoir intended to constitute the buffer volume.

According to one variant, said at least one opening of the bottom chamber of the reservoir or (and) said at least one orifice of the top chamber of the reservoir is (are), before use of the device, closed off by a cover or covers. Said at least one opening may thus be initially sealed (closed off) by means of a cover capable of breaking up on submersion, for example by dissolving in contact with the liquid or by rupture by means of any mechanism provided for this purpose. Said at least one orifice may also be initially sealed (closed off) by means of a cover capable of breaking up on submersion, for example under the effect of the gas pressure once the device is submerged or by rupture by means of any mechanism provided for this purpose.

According to one variant, before the submersion of the device, the bottom chamber of the reservoir is retracted. This variant may in particular exist as two embodiments: the flexible sock-shaped wall of said bottom chamber is folded around the top chamber and is capable of being deployed, or the wall of said bottom chamber is held around the top chamber and is capable of sliding along said top chamber. This variant (more particularly its second embodiment) is particularly advantageous for limiting the size of the device, under storage conditions before the use thereof.

The reservoir may be provided with ballast. The role of this ballast is, for example, to keep said reservoir submerged at the desired depth and in the desired position, despite the variation in the center of inertia of said reservoir under the effect of the variation in the level of the liquid in said reservoir and of the reduction in weight linked to the consumption of the solid charge. It may also be possible to deploy the bottom chamber at the moment the device is submerged, assuming that said bottom chamber is initially retracted (see above).

According to one variant, suitable for example for delivering gases at the surface of the liquid, the at least one orifice of the top chamber is extended by a gas delivery pipe (connected to said orifice). The role of said pipe is to drive the gases discharged from the reservoir to the site of their delivery, optionally at the surface of the liquid (for example, for supplying a fuel cell or a burner or a combustion turbine with gas).

The invention, in its process and device aspects, is now described, in no way limitingly, with reference to the appended figures. An example of the implementation of the process of the invention is more particularly described with reference to the last of said figures.

FIG. 1 schematically shows a submerged device of the invention for the production of gas at the surface.

FIGS. 2a and 2b schematically show a device of the invention (advantageous variant), respectively under storage and operating conditions.

FIGS. 3a and 3b also schematically show a device of the invention (another advantageous variant), respectively under storage and operating conditions.

FIG. 4 shows the diagram of the device used for the example (device of the type of that shown in FIG. 1) and the curves for measuring the operation of the device.

With reference to FIG. 1, the device 1 of the invention is submerged in a liquid L in an operational configuration. The device 1 consists of a reservoir 3 comprising a bottom chamber 4 (having initially been used as a buffer volume) and a top chamber 5 that communicate with one another and that are contiguous (chambers that are not structurally separated). The upper chamber 5 contains a charge 6 consisting of a permeable solid and it is provided with an orifice 8 connected to a pipe 7 that rises up to the surface of the liquid L. A valve 12 for controlling the volume flow rate of gas produced G is connected in the vicinity of the opening end 8' of the pipe 7 (in the variant represented). The bottom chamber 4 is provided with the opening 9 that is in communication with the liquid L. The pipe 7 makes it possible to convey to the surface the gas G produced by the device 1, for the use thereof by the component 11, which may for example consist of a burner, a fuel cell, a combustion turbine or an inflatable structure. In FIG. 1, which shows the device in operation, submerged, the liquid L has penetrated into the bottom chamber 4 (it has filled said bottom chamber 4) and, partly, into the top chamber 5 (the level of said liquid L in said top chamber 5 has been given the reference 2), so that it wets a fraction of the charge 6, so that it reacts with said solid charge 6 in order to produce the gas G.

It is understood perfectly in said FIG. 1 that the gas G is discharged through the top without being polluted by the liquid L.

FIGS. 2a and 2b illustrate an advantageous variant of the device of the invention, in particular that is advantageous as regards its size during storage, before use. The reservoir 31 consists of the two bottom and top chambers 41 and 51: the tubular top chamber 51 containing the solid charge 61 and being provided with an orifice 81, the tubular bottom chamber 41 being, firstly, before use of the device, retracted (as shown in FIG. 2a). The volume of the device during storage (before the use thereof) is therefore reduced to that of the top chamber 51 surrounded by the bottom chamber 41. When the device is used, that is to say just before its submersion, the wall 41a of the bottom chamber 41 is capable of sliding (for example under its own weight or pulled down by ballast), along the top chamber 51 in order to be positioned, as shown in FIG. 2b, so as to enlarge the volume of the reservoir 31, to create the bottom chamber 41, i.e. the buffer volume v (with reference to the use of said device). According to the variant illustrated, the wall 41a of the bottom chamber 41 is, after having slid, held at the chamber 51 by pins 131 that become lodged in housings 132 provided on the outer periphery of the top chamber 51. An O-ring advantageously intervenes at the point where the pins 131/housings 132 co-operate. The tubular chambers 41 and 51 preferably have a circular or rectangular cross section.

According to another configuration, shown in FIGS. 3a and 3b, the bottom chamber 41 consists of a flexible tubular membrane 41b, one end of which is firmly attached to the top chamber 51. This membrane 41b is initially folded, in (one or) several folds, upon itself around the top chamber 51, as shown in FIG. 3a. Said membrane 41b is capable of being deployed (for example under its own weight or pulled down by ballast) in order to form the bottom chamber 41 before submersion of the device.

The invention is now illustrated with a practical example of the implementation of the process of the invention according to FIG. 4. Said process is implemented with a device of the type of that shown schematically in FIG. 1 and reproduced in the left-hand part of said FIG. 4.

The example concerns the generation of hydrogen by reaction of water with a mixture (10 to 1 by weight) of sodium borohydride and citric acid (said citric acid acting as decomposition catalyst).

A permeable pulverulent solid charge 6, of 400 g of $NaBH_4$+40 g of citric acid intimately mixed, is placed in the top chamber 5 of the reservoir 3 having a total height of 16 cm. The solid charge 6 occupies the top chamber 5 of the reservoir 3 over a height of 9.5 cm. The bottom chamber 4 of the reservoir 3, acting as a buffer volume (v), therefore has a height of 6.5 cm. the device that was used for the implementation of the process of the invention is, as indicated above, represented schematically in parallel with the curves of measurements illustrating its operation in FIG. 4.

The top chamber 5 of the reservoir 3 is provided with an outlet orifice 8 having a controlled adjustable surface area, making it possible to adjust the maximum volume flow rate of hydrogen that can be discharged from said reservoir 3.

The device is submerged at t=0 s, the outlet orifice 8 being sized in order to deliver a volume flow rate of hydrogen: D1=0.32 l/min. The curves of the level of water in the reservoir (measured by means of a submerged camera) and of the flow rate of hydrogen produced by the device that are shown in FIG. 4 illustrate the operation of the device of the invention.

Starting from t=0 s, water penetrates into the reservoir (point a) driving out through the orifice 8 the gas (air=G0) initially contained in said reservoir 3. There is no production of hydrogen. At t=180 s, the water comes into contact with the bottom of the solid charge 6 (point b) and the production of hydrogen begins (point a'). As long as the volume flow rate of gas produced is less than the maximum volume flow rate of hydrogen (D1) exiting (discharge flow rate fixed by the diameter of the orifice 8), the water continues to rise and penetrate into the charge (up to point c). The volume flow rate of generated hydrogen increases rapidly. When the flow rate of hydrogen produced exceeds (point b') the maximum volume flow rate of hydrogen (D1) exiting (fixed by the dimension of the orifice), the volume of produced gas contained in the reservoir then increases and the water begins to be pushed back, shortly after having penetrated a few millimeters into the charge 6 (point c). Since the charge has been wetted, the flow rate of hydrogen continues to increase for a few instants despite the water level falling below the charge 6. The volume flow rate of generated hydrogen then decreases and when it passes back below (point c') the threshold of maximum volume flow rate D1 exiting, fixed by the diameter of the orifice 1, the volume of gas contained in the reservoir 3 decreases and the water then begins again to rise in the reservoir 3 (starting from point d). This cycle is thus reproduced several times, providing the self-regulation of the production of hydrogen as a function of demand.

The hydrogen produced is (virtually) free of impurities.

The invention claimed is:

1. A method for the production of gas and self-regulation thereof, comprising
submerging a reservoir that includes a charge of solid into a liquid capable of producing gas by reaction with the charge of solid, wherein the charge of solid is in a form of at least one selected from pellets, foam, and powder, the charge of solid is horizontally arranged inside the reservoir above a buffer space free of the charge of solid, the charge of solid extends over the full cross-section of the reservoir such that it obstructs the full cross-section of the reservoir, the charge of solid is permeable to the liquid and the gas, the reservoir includes at least one opening allowing the liquid to flow into the buffer space, and the reservoir includes at least one orifice for discharging the gas;
allowing the liquid to flow into the buffer space through the opening of the reservoir and rise into the reservoir while initial gas in the reservoir is discharged through the orifice; and
allowing the gas to be generated as the liquid contacts the charge of solid, the generated gas rising through the charge of solid to be discharged through the orifice, wherein the level of the liquid in the reservoir is self-controlled as a function of the difference between the volume of the gas generated and the volume of the gas discharged;
wherein the charge of solid includes a metal hydride, and hydrogen is generated when the charge of solid contacts with the liquid;
wherein the reservoir further comprises
a top chamber in an upper part of the reservoir, the top chamber including the charge of solid and the at least one orifice, and
a bottom chamber in a lower part of the reservoir, the bottom chamber being defined by a movable wall, the bottom chamber including the at least one opening allowing the liquid to flow into the reservoir, the bottom chamber being retracted prior to the submerging.

2. The method according to claim 1, which comprises adjusting the pressure of the gas in the reservoir via a submersion depth of said reservoir in said liquid.

3. The method according to claim 1, which comprises delivering said gas discharged from said reservoir via said at least one orifice at depth or at the surface of said submersion liquid.

4. The method according to claim 1, which comprises controlling the volume flow rate of gas discharged by controlled variation of a cross section of said at least one orifice.

5. The method according to claim 1, wherein said solid charge is in the form of pellets which are in bulk.

6. The method according to claim 1, wherein said liquid is at least one selected from freshwater, seawater or aqueous hydrogen peroxide solution.

7. The method according to claim 1, further comprising supplying the generated hydrogen to a component selected from fuel cells, burners and combustion turbines.

8. The method according to claim 1, wherein said charge comprises a metal borohydride.

9. The method according to claim 8, wherein said charge comprises $Mg(BH_4)_2$ or $NaBH_4$.

10. The method according to claim 1, wherein the movable wall of the bottom chamber comprises a flexible sock-shaped wall folded around the top chamber and capable of being expanded.

11. The method according to claim 1, wherein the movable wall of said bottom chamber is held around the top chamber and capable of sliding along the top chamber.

* * * * *